US007509505B2

(12) United States Patent
Randall et al.

(10) Patent No.: US 7,509,505 B2
(45) Date of Patent: Mar. 24, 2009

(54) METHOD AND SYSTEM FOR MANAGING POWER DELIVERY FOR POWER OVER ETHERNET SYSTEMS

(75) Inventors: Anthony L. Randall, Austin, TX (US); Robert A. Marshall, Georgetown, TX (US); Rachel C. Neal, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 341 days.

(21) Appl. No.: 11/028,907

(22) Filed: Jan. 4, 2005

(65) Prior Publication Data

US 2006/0149978 A1 Jul. 6, 2006

(51) Int. Cl.
*G06F 1/28* (2006.01)

(52) U.S. Cl. .......................................... 713/300; 307/35
(58) Field of Classification Search .................... 307/35; 713/300
See application file for complete search history.

(56) References Cited

U.S. PATENT DOCUMENTS

| | | | |
|---|---|---|---|
| 4,131,767 A | 12/1978 | Weinstein | 179/170.2 |
| 4,161,719 A | 7/1979 | Parikh et al. | 340/147 SY |
| 4,232,199 A | 11/1980 | Boatwright et al. | 179/18 B |
| 4,397,020 A | 8/1983 | Howson | 370/105 |
| 4,532,626 A | 7/1985 | Flores et al. | 370/85 |
| 4,599,494 A | 7/1986 | Welty | 179/84 T |
| 4,626,954 A | 12/1986 | Damiano et al. | 361/96 |
| 4,710,949 A | 12/1987 | Ahuja | 379/26 |
| 4,723,267 A | 2/1988 | Jones et al. | 379/93 |
| 4,875,223 A | 10/1989 | Curtis | 375/36 |
| 4,969,179 A | 11/1990 | Kanare et al. | 379/33 |
| 5,029,201 A | 7/1991 | Bindels | 379/98 |
| 5,034,948 A | 7/1991 | Mizutani et al. | 379/79 |
| 5,056,131 A | 10/1991 | Kanare et al. | 379/33 |
| RE33,900 E | 4/1992 | Howson | 370/105 |
| 5,199,049 A | 3/1993 | Wilson | 375/104 |
| 5,223,806 A | 6/1993 | Curtis et al. | 333/12 |
| 5,311,518 A | 5/1994 | Takato et al. | 370/110.1 |
| 5,321,372 A | 6/1994 | Smith | 333/1 |
| 5,406,260 A | 4/1995 | Cummings et al. | 340/568 |

(Continued)

FOREIGN PATENT DOCUMENTS

EP 0 777 357 A2 4/1997

(Continued)

OTHER PUBLICATIONS

Kiss, Peter (candidate), "Chapter 3, Cascaded Delta-Sigma ADCs", Thesis; "Politehnica" University of Timisoara; cover page plus pp. 45-71, Aug. 20, 1999 revised: Dec. 31, 1999.

(Continued)

*Primary Examiner*—Tse Chen
(74) *Attorney, Agent, or Firm*—BainwoodHuang

(57) ABSTRACT

A method for managing the delivery of power for a plurality of devices includes allocating a power limit for each of the plurality of devices and providing power to at least one of the plurality of devices. The method also includes, in response to the providing of power, measuring the amount of power utilized by each of at least one of the at least one of the plurality of devices and determining that the amount of power exceeds the power limit for the device.

17 Claims, 4 Drawing Sheets

U.S. PATENT DOCUMENTS

| | | | |
|---|---|---|---|
| 5,541,957 A | 7/1996 | Lau | 375/258 |
| 5,550,917 A | 8/1996 | Tallec | 379/442 |
| 5,574,748 A | 11/1996 | Vander Mey et al. | 375/204 |
| 5,625,621 A | 4/1997 | Christensen et al. | 370/248 |
| 5,642,052 A | 6/1997 | Earle | 324/556 |
| 5,655,077 A | 8/1997 | Jones et al. | 395/187.01 |
| 5,659,542 A | 8/1997 | Bell et al. | 370/496 |
| 5,670,937 A | 9/1997 | Right et al. | 340/506 |
| 5,671,354 A | 9/1997 | Ito et al. | 395/187.01 |
| 5,680,397 A | 10/1997 | Christensen et al. | 370/421 |
| 5,684,950 A | 11/1997 | Dare et al. | 395/187.01 |
| 5,784,237 A | 7/1998 | Velez | 361/62 |
| 5,796,185 A | 8/1998 | Takata et al. | 307/140 |
| 5,799,040 A | 8/1998 | Lau | 375/258 |
| 5,802,042 A | 9/1998 | Natarajan et al. | 370/255 |
| 5,815,665 A | 9/1998 | Teper et al. | 395/200.59 |
| 5,912,963 A | 6/1999 | Begeja et al. | 379/221 |
| 5,918,016 A | 6/1999 | Brewer et al. | 395/200.5 |
| 5,936,442 A | 8/1999 | Liu et al. | 327/142 |
| 5,944,824 A | 8/1999 | He | 713/201 |
| 5,947,773 A | 9/1999 | Karam | 439/676 |
| 5,994,998 A | 11/1999 | Fisher et al. | 340/310.01 |
| 6,011,910 A | 1/2000 | Chau et al. | 395/200.59 |
| 6,021,496 A | 2/2000 | Dutcher et al. | 713/202 |
| 6,040,969 A | 3/2000 | Winch et al. | 361/82 |
| 6,047,376 A | 4/2000 | Hosoe | 713/201 |
| 6,092,196 A | 7/2000 | Reiche | 713/200 |
| 6,098,174 A | 8/2000 | Baron et al. | 713/300 |
| 6,115,468 A | 9/2000 | De Nicolo | 379/413 |
| 6,134,666 A | 10/2000 | De Nicolo | 713/300 |
| 6,140,911 A | 10/2000 | Fisher et al. | 340/310.01 |
| 6,218,930 B1 | 4/2001 | Katzenberg et al. | 340/310.01 |
| 6,233,235 B1 | 5/2001 | Burke et al. | 370/356 |
| 6,295,356 B1 | 9/2001 | De Nicolo | 379/413 |
| 6,308,240 B1 | 10/2001 | De Nicolo | 710/300 |
| 6,310,781 B1 | 10/2001 | Karam | 361/764 |
| 6,317,839 B1 | 11/2001 | Wells | 713/320 |
| 6,345,047 B1 | 2/2002 | Regnier | 370/352 |
| 6,347,949 B1 | 2/2002 | Edwards et al. | 439/170 |
| 6,357,011 B2 | 3/2002 | Gilbert | 713/300 |
| 6,473,608 B1 | 10/2002 | Lehr et al. | 455/402 |
| 6,535,983 B1 | 3/2003 | McCormack et al. | 713/310 |
| 6,541,878 B1 | 4/2003 | Diab | 307/17 |
| 6,546,494 B1 | 4/2003 | Jackson et al. | 713/300 |
| 6,629,248 B1 | 9/2003 | Stachura et al. | 713/340 |
| 6,674,271 B2 | 1/2004 | Choo et al. | 323/282 |
| 6,701,443 B1 | 3/2004 | Bell | 713/300 |
| 6,762,675 B1 | 7/2004 | Cafiero et al. | 340/10.42 |
| 6,804,351 B1 | 10/2004 | Karam | 379/413 |
| 6,874,093 B2 | 3/2005 | Bell | 713/300 |
| 6,952,785 B1 | 10/2005 | Diab et al. | 713/300 |
| 2002/0063584 A1 | 5/2002 | Molenda et al. | 327/67 |
| 2003/0135766 A1 | 7/2003 | Zyskowski et al. | 713/300 |
| 2004/0025066 A1 | 2/2004 | Jackson et al. | 713/300 |
| 2004/0156496 A1 | 8/2004 | Karam | 379/413 |
| 2004/0230846 A1* | 11/2004 | Mancey et al. | 713/300 |
| 2005/0102544 A1* | 5/2005 | Brewer et al. | 713/320 |
| 2005/0262364 A1 | 11/2005 | Diab et al. | 713/300 |
| 2005/0283627 A1 | 12/2005 | Diab et al. | 713/300 |
| 2006/0125422 A1* | 6/2006 | Costa | 315/294 |

FOREIGN PATENT DOCUMENTS

| | | |
|---|---|---|
| GB | 2 034 055 A | 5/1980 |
| JP | 200214964 A | 8/2000 |
| WO | WO 99/53408 | 10/1999 |

OTHER PUBLICATIONS

Daniel Dove, Powerpoint Presentation, "Power over the DTE", Jan. 2000.

Robert Muir, Powerpoint Presentation: "Update on Diode Discovery Process", May 2000.

"Data Terminal Equipment (DTE) Power via Media Dependent Interface (MDI)", IEEE P802.3af/D3.01 (Revision of IEEE Std. 802.3-2000), May 2002.

"33. Data Terminal Equipment (DTE) Power via Media Dependent Interface (MDI)", Draft Supplement to IEEE Standard 802.3 (IEEE Draft P802.3af/D3.2), Sep. 5, 2002.

"Amendment: Data Terminal Equipment (DTE) Power via Media Dependent Interface (MDI)", IEEE Draft P802.3af/D4.3, (IEEE Standards Department, Draft Amendment 802-3-2002), Apr. 2003.

Hugh Barrass, "Multi-Pair Aggregate Power Distribution"—U.S. Appl. No. 10/287,886, pp. 1-25, Nov. 4, 2002.

Jeffrey D. Provost, "Inline Power Control"—U.S. Appl. No. 10/618,211, pp. 1-15, Jul. 11, 2003.

Daniel C. Biederman, "Inline Power Based Device Communications"—U.S. Appl. No. 10/651,596, pp. 1-27, Aug. 29, 2003.

Cafiero, et al. "Method and Apparatus for Remote Powering of Device Connected to Network"—U.S. Appl. No. 10/836,923, pp. 1-16, Apr. 29, 2004.

Roger A. Karam, "Method and Apparatus for Detecting a Compatible Phantom Powered Device Using Common Mode Signaling"—U.S. Appl. No. 10/855,212, pp. 1-29, May 26, 2004.

IEEE Draft P802.3af/D3.0; IEEE Computer Society, The Institute of Electrical and Electronics Engineers, Inc., 2001.

IEEE Draft P802.3af/D3.01; IEEE Computer Society, The Institute of Electrical and Electronics Engineers, Inc., 2001.

IEEE Draft P802.3af/D3.1; IEEE Computer Society, The Institute of Electrical and Electronics Engineers, Inc., 2002.

IEEE Draft P802.3af/D3.2; IEEE Computer Society, The Institute of Electrical and Electronics Engineers, Inc., 2002.

IEEE Draft P802.3af/D4.0; IEEE Computer Society, The Institute of Electrical and Electronics Engineers, Inc., 2002.

"*IEEE Standards*"; 802.3af™; IEEE Computer Society, The Institute of Electrical and Electronics Engineers, Inc., Jun. 18, 2003.

IEEE Draft P802.3af/D4.01; IEEE Computer Society, The Institute of Electrical and Electronics Engineers, Inc., 2003.

Galit Mendelson, "Installing an IP Telephony Network Using Power over LAN", Online, (Nov. 3, 2002) pp. 1-10, XP002340946 Inet, Retrieved from the Internet: URL: http://ww.powerdsine.com/Documentation/WhitePapers/Installing_IP_Telephony_network_with_PoL.pdf> retrieved on Aug. 16, 2005, p. 7, line 16-line 19.

International Search Report for PCT/US2005/013365, Search completed Aug. 17, 2005, 3 pages.

U.S. Appl. No. 11/021,151, filed Dec. 23, 2004, entitled Methods and Apparatus for Provisioning Uninteruptible Power for Power of Ethernet Application, by Wael William Diab and Matthew A. Laherty.

U.S. Appl. No. 10/090,224, filed Mar. 4, 2002, entitled Methods and Apparatus for Powering a Data Communications Port, by Wael William Diab, Roger Karam, and Premkumar Jonnala.

\* cited by examiner

METHOD AND SYSTEM FOR MANAGING POWER DELIVERY FOR POWER OVER ETHERNET SYSTEMS

TECHNICAL FIELD OF THE INVENTION

This invention relates generally to power supply systems and more particularly to a method and system for managing the delivery of power for power over Ethernet (PoE) systems.

BACKGROUND

Power over Ethernet systems are seeing increasing use in today's society. Power over Ethernet, sometimes abbreviated PoE, refers to providing power to Ethernet devices over an Ethernet line that is also used to communicate data. Thus, power over Ethernet devices do not require separate power supply lines. In some instances, the power may be supplied by a power supply contained within an Ethernet switch. Because the power supply does not generally have the power capability to supply maximum power to every port, there is a limit on the number of power over Ethernet devices that can be connected to a given power supply. A port may be denied power, if it will result in oversubscription of the power supply. Example power over Ethernet devices that can benefit from receiving power over the Ethernet communication lines include an internet protocol telephone, a badge reader, a wireless access point, a video camera, and others.

Traditionally, when a power over Ethernet device is connected to a power supply, the power over Ethernet device is allocated a maximum power class according to IEEE standard 802.3af denoted as class 0 thru 4. These maximum values correspond to the maximum amount of power that will be supplied by the power supply to the power over Ethernet device. IEEE standard 802.3af provides for three levels of 15.4 watts, 7.5 watts, and 4.0 watts for these power over Ethernet devices. In certain circumstances, such allocation prevents the power supply from being utilized to its full capability due to the coarse granularity in class.

A software program referred to as Cisco Discovery Protocol allows for more granular specification of the limit for the power over Ethernet powered devices other than the above-described IEEE levels. However, the power supply still may have unutilized capacity.

SUMMARY OF THE INVENTION

A method for managing the power provided for a plurality of devices includes allocating a power limit for each of the plurality of devices and providing power to at least one of the plurality of devices. The method also includes, in response to the providing of power, determining the amount of power utilized by each of at least one of the at least one of the plurality of devices and determining that the amount of power exceeds the power limit for the device.

Embodiments of the invention provide numerous technical advantages. Some, none, or all of the embodiments may benefit from the following advantages. According to one embodiment of the invention, powered devices in a power over Ethernet system may be oversubscribed because a user specified power limit for the device may be utilized in combination with monitoring of the power utilized by that device and adjustment of its limit. Thus, where the power supply is not being utilized to its full capacity, the power limit for a particular device may be increased to allow for additional power requirements of that device. This allows greater use of the full capability of a power supply. According to another embodiment, greater usage of a power supply may be achieved by oversubscribing a power supply in conjunction with measurement of the overall usage of the power supplied by the power supply. If the overall usage exceeds a specified level, power may be terminated to one or more of the power devices until acceptable usage levels are met.

Other advantages may be readily apparent to those skilled in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS

Embodiments of the invention are best understood by referring to FIGS. 1 through 5B of the drawings, like numerals being used for like and corresponding parts of the various drawings.

Figure 1:
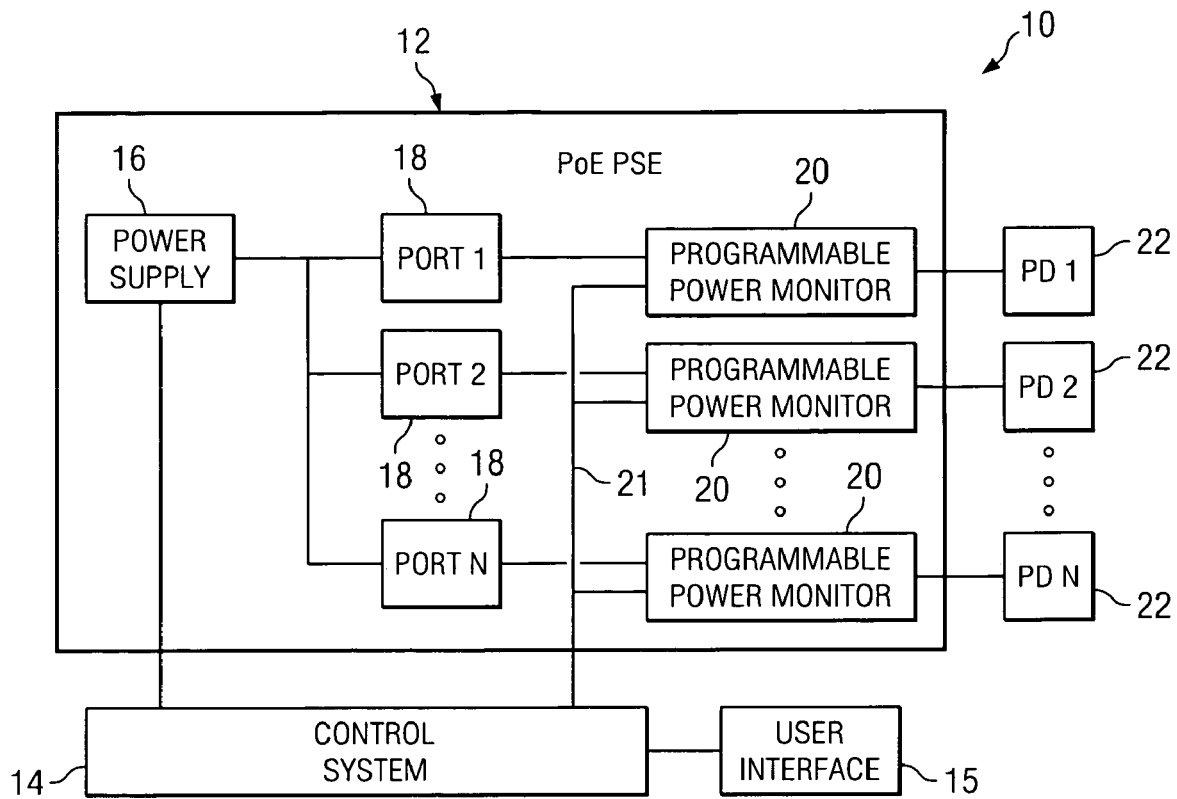
FIG. 1 is a block diagram of portions of a power over Ethernet system showing components of the power supply and connections to the powered devices.

FIG. 1 is a block diagram of a system 10 associated with the provision of power to a plurality of power over Ethernet devices. System 10 includes power over Ethernet power source equipment 12, which provides power to a plurality of power over Ethernet powered devices 22. Associated with power over Ethernet power source equipment 12 is a control system 14. Control system 14 manages the provisioning of power by power over Ethernet power source equipment 12 to powered devices 22. Power over Ethernet power source equipment 12 includes a power supply 16 associated with a plurality of ports 18. In this embodiment, each port 18 has an associated programmable power monitor 20 that monitors the power supplied over that port to the respective power device 22. Control system 14 may increase the user specified power limit for each device in response to a determination that the particular device is utilizing more power than its specified limit. Control system 14 also compares the sums of the power supplied to the plurality of powered devices 22 against the capacity of the power supply 16, to determine if there exists additional capacity to provide more power to powered devices 22 or if the system limit is exceeded. This allows oversubscription of power supply 16. Also illustrated in FIG. 1 is a user interface 15.

User interface 15 allows a user to specify a power limit for each power over Ethernet powered device 22. This power limit specifies the maximum amount of power that power over Ethernet powered device 22 should receive. However, it may be the case that any given power over Ethernet powered device 22 may actually require more power than its user defined maximum limit. User interface 15 may be implemented in software or hardware and allows a user to enter power limits for powered devices 22. This allows a user to specify the expected power use of a particular powered device 22 which may or may not fall near conventional IEEE levels. By allowing user specification of the expected power usage of each of the plurality of powered devices, oversubscription for power supply 16 may occur. This advantage allows for the maximum utilization of power supply 16. In some embodiments, power over Ethernet power source equipment 12 may include an overall power monitor that measures the overall power supplied by power supply 16 at any given time to powered devices 22.

Control system 14 may be implemented in software or hardware. One example of a software embodiment is described in greater detail in conjunction with FIG. 2. Control system 14 allows the configuring of power limits for each device by a user, in conjunction with user interface 15. This configured value may differ from the conventional IEEE values of 15.4 watts, 7.5 watts, or 4.0 watts. This provides one advantage of allowing more granular control of the power limits for particular devices, particularly devices whose maximum power requirements do not fall near one of the three IEEE levels.

Power supply 16 provides power for the plurality of ports 18 and then to the plurality of power over Ethernet powered devices 22. Although any suitable power supply may be used, one example is a 370 watt, 50V, isolated power supply manufactured by Delta Electronics. Although illustrated as a single power supply, power over Ethernet power supply equipment may incorporate multiple power supplies 16.

Ports 18 correspond in a one-to-one fashion to the respective ones of the plurality of power over Ethernet powered devices 22. One example of ports 18 is conventionally known in the industry and is therefore not described here in greater detail. However, it should be emphasized that unconventional ports 18 may also be utilized without departing from the scope of the present invention.

Programmable power monitors 20 measure the amount of power being utilized and supplied to respective ones of power over Ethernet powered devices 22. Programmable power monitors 20 may be implemented by hardware or software but in one particular embodiment utilizes hardware. Programmable power monitors 20 may store the power limit associated with the respective powered device 22; however, the limit may be stored in other locations, including within control system 14. The measurement portion of programmable power monitor 20, according to one example, may be formed according to conventional techniques, which are well known and is not described here for simplicity of description. However, it is noted that programmable power monitor may measure power utilized by the associated powered device 22 by making both current and voltage measurements, or by making current measurements only and assuming a known power supply 16 output voltage. Unconventional power measurement techniques may also be used to the power measurement portion of programmable power monitor 20.

Powered devices 22 may be any power over Ethernet device that requires power. Examples include an internet protocol phone, a wireless access point, a video camera, and a badge reader.

In operation, power supply 16 provides power through ports 18 to one or more of power devices 22. Programmable power monitors 20 measure the amount of power supplied to the respective ones of power over Ethernet powered devices 22. If it is determined that a particular one of the power over Ethernet devices 22 exceeds its specified power limit, programmable power monitor communicates with control system 14 over lines 21 informing control system 14 that a particular power over Ethernet device is exceeding its power limit. Control system 14 also receives the amount of power being drawn by each power device from programmable power monitors 20. In response to the determination that a particular power over Ethernet device 22 is exceeding its power limit, control system 14 determines whether power supply 16 is exceeding its maximum power limit or whether additional power capability exists. If additional power capability exists, then control system 14 may modify the power limit associated with a particular power over Ethernet powered device 22, allowing that device to receive additional power without creating a fault condition. Control system 14 may make this determination that power supply 16 is operating within its overall power limit by adding the power usage of each of the power over Ethernet devices 22, or alternatively, through use of an overall power monitor, as described above. In one embodiment, in response to control system 14 determining that the capacity of the power supply is exceeded, control system 14 removes power from at least one of at least one of the power over Ethernet powered devices 22. The determination of which ones to remove power from is according to the configuration of control system 14, which may be modified by user interface 15.

In this manner, system 10 can be configured with nominal values for each of the plurality of power over Ethernet devices but adjustments may be made that represent the actual use. In this manner such a system can be safely oversubscribed.

Figure 2:
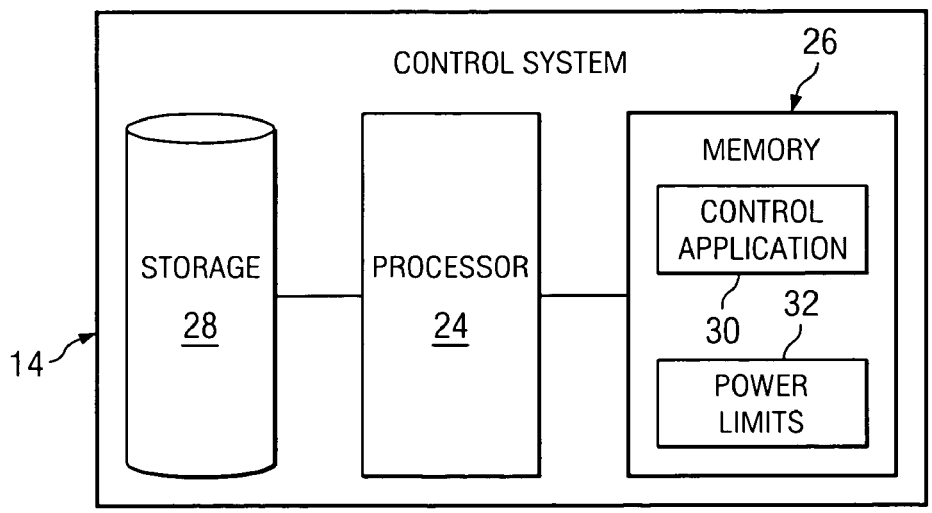
FIG. 2 is a block diagram of an example of the control system of FIG. 1.
Figure 3:
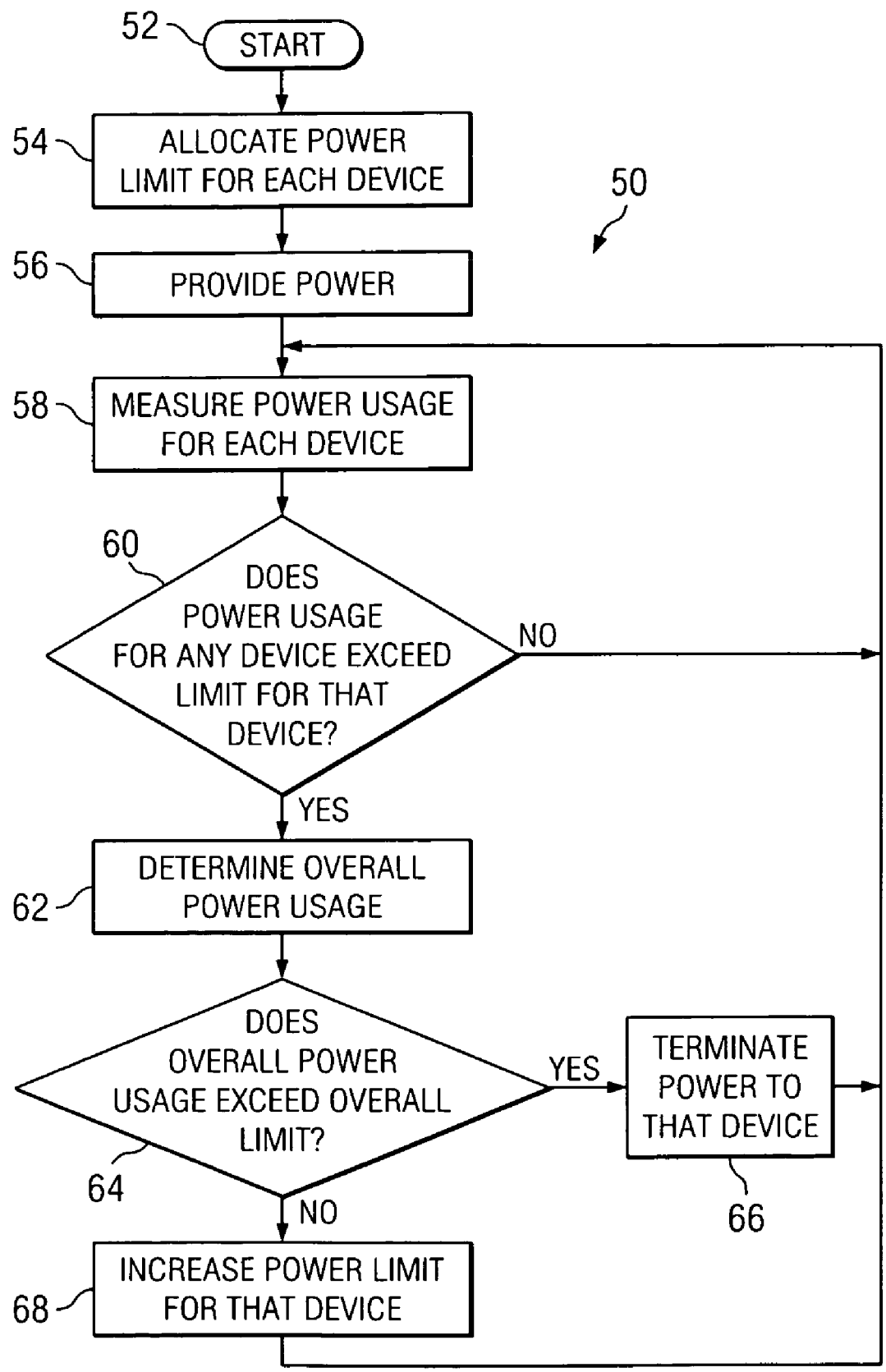
FIG. 3 is a flowchart illustrating example steps associated with managing the provisioning of power to a plurality of powered devices according to the teachings of one embodiment of the invention.

FIG. 2 is a block diagram of one example of control system 14. In this example control system 14 is implemented through use of a software program. In this example, control system 14 includes a processor 24, memory 26, and storage 28. Memory 26 may store a control application 30 as well as power limits 32. The operation of control application 30 is described in greater detail below in conjunction with FIG. 3; however, it should be emphasized that, although the method of FIG. 3 is described in the context of control application 30, such a method could be implemented by other means such as through hardware. Storage 28 provides additional storage that may be utilized by processor 24 in executing control application 30. Processor 24 may take any suitable form including custom processors or off-the-shelf processors. It is also emphasized that the entire control system 14 also may be implemented in hardware, such as through an application-specific integrated circuit.

FIG. 3 is a flowchart illustrating example steps associated with providing power to a plurality of Ethernet devices according to the teachings of the invention. In one example, unless the context indicates otherwise, these steps may be performed by control system 14; however, they may also be performed by suitable hardware or software such as by programmable power monitors 20 having suitable logic for implementing these described steps. The method 50 begins at step 52. At step 54 a power limit is allocated for each power over Ethernet powered device 22. This may be performed automatically by control system 14, by a user through user interface 15, or through other suitable methods. According to the teachings of the invention, the allocated power limit for each device may include values other than those specified by IEEE, which are 15.4 watts, 7.5 watts, and 4.0 watts; however, these power limits may also be utilized.

After allocation of a power limit for each device, power is provided to any device requiring power at step 56. The power limit allocated for each device may be stored in control system 14 or may also be stored in programmable power monitors 20, or in other suitable locations. At step 58, power usage for each device is measured. In the example of FIG. 1, such power usage is measured by programmable powered monitors 20.

At step 60 a determination is made of whether the power usage for any powered Ethernet device exceeds the limit for that device. If not, processing continues at step 58 in which power usage is continually monitored for each of the power over Ethernet devices. However, if at step 60 it is determined that the power usage for any particular device is exceeded, then it is determined whether the overall power limit for power supply 16 is exceeded at step 64. This determination may be based upon an overall power usage determination that occurs independently of this method or may involve specifically determining the power usage for this purpose, as indicated at step 62. Such determination of an overall power usage may involve measuring the overall power usage or measuring power usage for each power over Ethernet device 22 and summing that usage.

If the overall usage is exceeded, then power may be terminated to the device 22 that exceeds its particular limit, as noted at step 66. In that event, control system 14 may remove a fault condition that resulted from the power over Ethernet device 22 exceeding its power limit. Additionally, a user may be informed that power has been discontinued to the power over Ethernet device 22. To allow the particular power over Ethernet device 22 to resume operation, its power limit may be reconfigured before power is supplied to that device again.

The result of step 64 indicates that the overall limit for the power supply 16 is not exceeded, then the power limit for the particular power over Ethernet device 22 may be increased, allowing that device to receive more power than it was originally allocated. As an alternative, control system 14 may be configured to not allow a preset power limit to be increased in which case processing would proceed as described above with respect to step 66. However, if the power limit is increased at step 68, the power limit may be increased to any suitable amount including those specified by the IEEE 802.3af standard or other values. Processing continues after step 66 and step 68 at step 58 in which power usage for each device is continually monitored.

Figure 4:
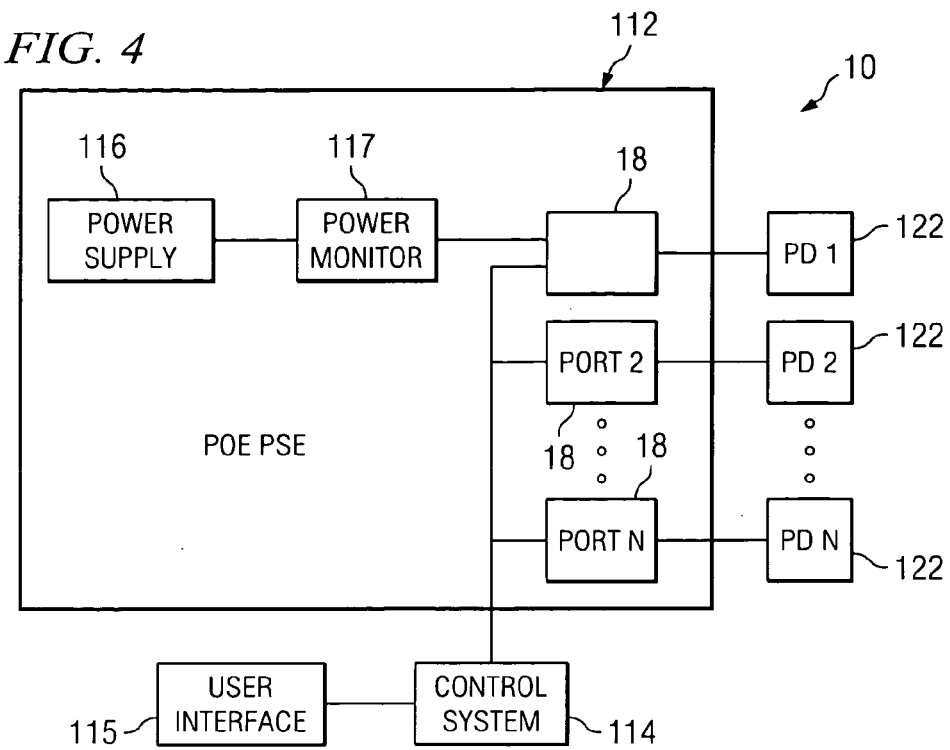
FIG. 4 is a block diagram of an alternative embodiment of a power supply according to the teachings of the invention.

FIG. 4 is a block diagram illustrating an alternative embodiment of a system 110 for providing power for a plurality of power over Ethernet devices. System 110 is similar to system 10 with like components having analogous reference numerals. However, power over Ethernet power supply equipment 112 includes an overall power monitor 117 that measures the overall amount of power supplied by power supply 116 to the plurality of power over Ethernet devices 122. Power monitor 117 may utilize any appropriate method of measuring power delivered by power supply 116. This method may include both a current and a voltage measurement or a current measurement only, with an known power supply 116 output voltage. Power supply equipment 112 does not necessarily measure the power usage for each individual powered device. In addition, control system 114 may execute different procedures than those described above with respect to FIGS. 1 through 3 in controlling the power supply to a particular power over Ethernet device 122.

Control system 114 may still receive user specified power limits for each of the plurality of power Ethernet devices 122 through user interface 115 or through other suitable system. However, in this example, the power limit associated with any particular power device 122 is not modifiable in response to a real-time measurement of the amount of power utilized by a particular power over Ethernet device. Rather, in response to a determination that the overall power usage by power over Ethernet devices 122 exceeds the limit for power supply 116, then appropriate steps are taken to lower this power usage. Example steps associated with controlling power to power over Ethernet devices 122 are described in conjunction with FIGS. 5A and 5B.

Figure 5A:
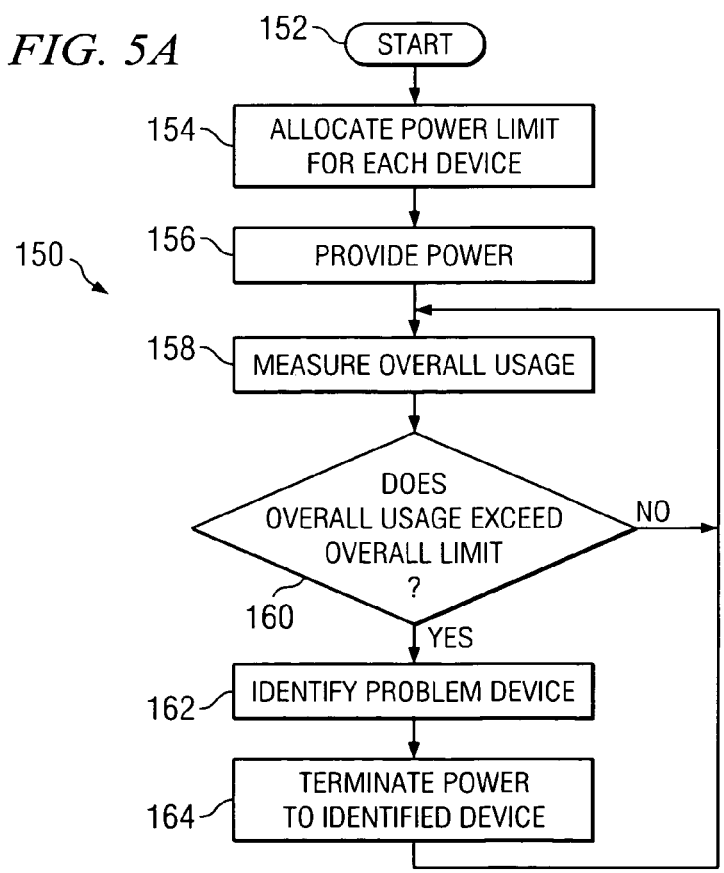
FIG. 5A is a flowchart illustrating example steps associated with the provision of power to a plurality of powered devices according to the teachings of another embodiment of the invention.

FIG. 5A is a flowchart illustrating example steps associated with managing power supplied to a plurality of power over Ethernet devices. The method 150 begins at step 152. At step 154 a power limit is allocated for each of a plurality of Ethernet devices. These power limits may differ from the three values currently available under IEEE standard, which are 15.4 watts, 7.5 watts, and 4.0 watts; however, the IEEE values may be used. At step 156 power is provided to any of the plurality over Ethernet devices 122 that require power. At step 158 the collective amount of power utilized by the power over Ethernet devices 122 is determined. In one example, this determination is made by a power monitor, such as power monitor 117.

At step 168 a determination is made of whether an overall power usage limit is exceeded. If not, processing loops back to step 158 in which the amount of power being utilized is continually monitored. If the overall usage limit is exceeded, processing continues at step 162 in which an attempt is made to identify a particular power over Ethernet device that is causing the overall power limit to be exceeded. The approach utilized to determine the particular power over Ethernet device that is causing the problem may vary. One example is described below in conjunction with FIG. 5B.

As an alternative to step 162 of identifying a particular power over Ethernet device that is causing the overall power usage to be exceeded, power to particular devices may be terminated based upon a device priority. This priority may specify which power over Ethernet devices would receive priority over others in the case where the power supply cannot supply power to all of the devices. This priority may be set through use of an interface such as user interface 115, or through other techniques. As another alternative, power may be terminated to power over Ethernet devices without attempting to identify the cause of the over-usage problem until the overall power limit is not exceeded, without attention to any priority allocation.

In the embodiment in which the particular power over Ethernet device causing the power over-usage problem is identified, processing continues at step 164 in which power is terminated to the identified device. Processing then returns to step 158 in which the overall power usage is continually monitored.

Figure 5B:
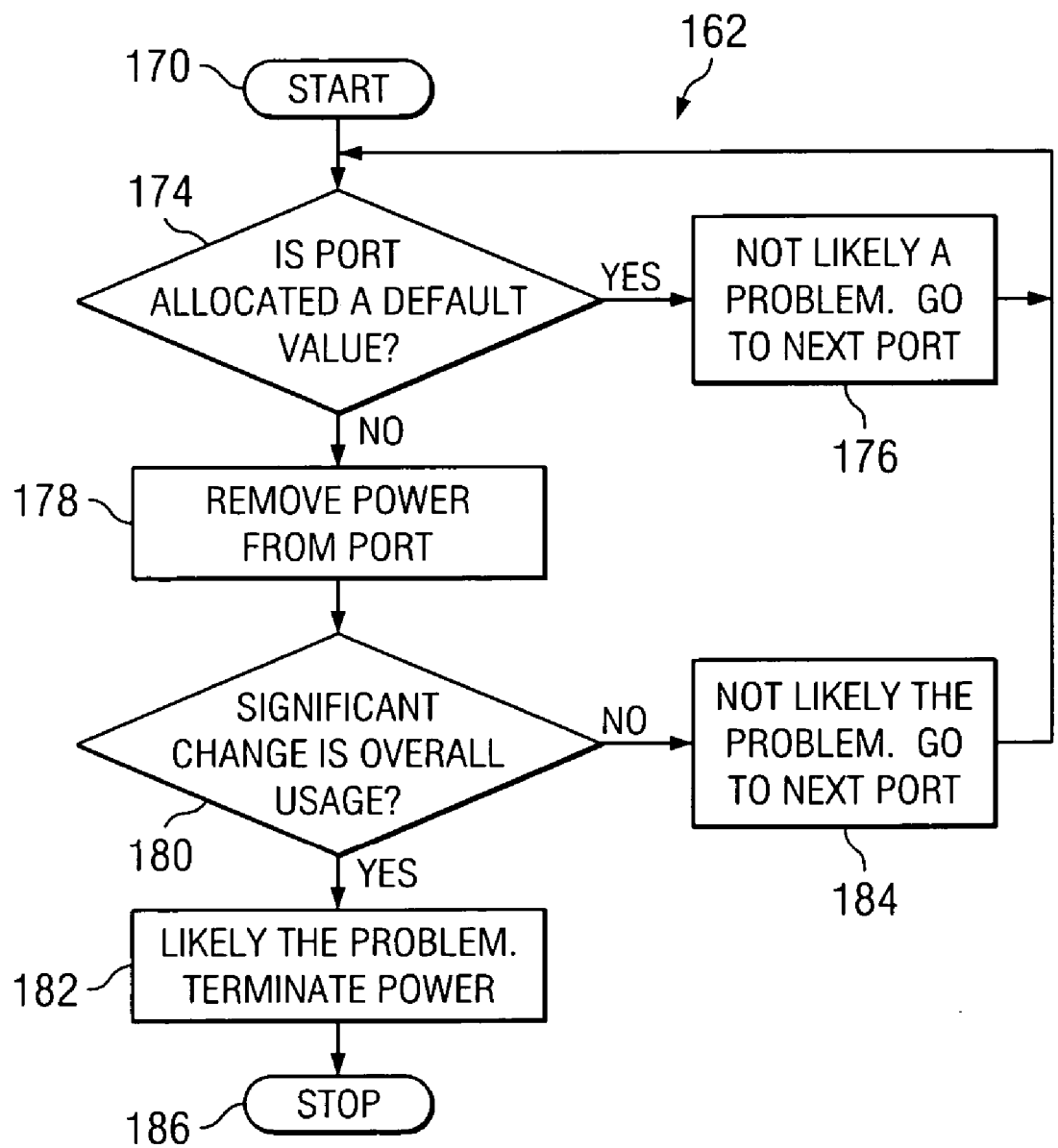
FIG. 5B is a flowchart illustrating example steps associated with the step in FIG. 5A of identifying a problem with providing power to one of the powered devices.

FIG. 5B is a flowchart illustrating one example of steps associated with step 162 of FIG. 5A of identifying a problem device. In general, method 162 involves stepping through each port, terminating power to that port, and observing the effect on the overall power usage. If the overall effect is a significant decrease in the power usage, this may indicate the particular port chosen corresponds to the power over Ethernet device causing the power usage to be exceeded. In such a case, power is terminated to that device.

More specifically, the method begins at step 170. Each port is stepped through with the below-described steps until the port corresponding to the power over Ethernet device causing the over-usage problem is identified. At step 174 it is determined whether the port is allocated a default value, corresponding to one of the IEEE values, or whether the port is allocated a user-specified value. If the port has a default value corresponding to one of the IEEE values then it is not likely the cause of an over-usage problem, which indicated a step 176, and processing returns at step 174 for the next port.

However, if the port is not allocated a default value, or all remaining ports are allocated default values, then this indicates the port is potentially associated with the over-usage problem and power is temporarily removed from that port, as indicated at step 178. At step 180 a determination is made whether there is a significant change in the overall power usage. If so, this indicates that the power over Ethernet device associated with that port is likely the problem and power is temporarily terminated to that device, as indicated at step 182. However, if at step 178 no significant change in the overall usage is measured, this indicates that this port is not likely the problem and processing continues at the next port back at step 172. It is noted that when referring to a significant change, it is meant to refer to a change in overall power usage greater than the allocated power limit for that particular device. Step 184 may also involve returning power to the Ethernet device for which power was temporarily terminated; however, in one example, power remains terminated until the port causing the problem is identified. The method concludes at step 186.

Although the present invention and its advantages have been described in detail, it should be understood that various changes, substitutions, and alterations can be made therein without departing from the spirit and scope of the invention as defined by the appended claims.

What is claimed is:

1. A system for providing power to a plurality of Ethernet devices comprising: a power supply to provide power to the plurality of Ethernet devices; a power monitor to determine the amount of power collectively utilized by the plurality of Ethernet devices; a power limit system to store a power limit associated with the respective ones of the plurality of Ethernet devices; and a control system to terminate power to each of the plurality of Ethernet devices in response to a determination that the amount of power collectively used by the plurality of Ethernet devices exceeds a limit for the collective power usage and to further determine the identity of a particular one of the plurality of devices that causes the collective power limit to be exceeded; wherein the control system further determines the identity of a particular one of the plurality of devices that causes the collective power limit to be exceeded and terminates power to the particular one of the plurality of devices; and wherein the control system further determines the identity of the particular one of the plurality of devices by: terminating power to one of the plurality of Ethernet devices; measuring the amount of power collectively used by the plurality of Ethernet devices with power temporarily terminated to the one of the plurality of Ethernet devices, and subsequently subtracting the measured amount from the amount of power collectively used by the plurality of Ethernet devices prior to terminating power to the one of the plurality of Ethernet devices, thereby calculating a change in overall power usage attributable to the one of the plurality of Ethernet devices; if the change in overall power usage attributable to the one of the plurality of Ethernet devices is greater than the power limit associated with the one of the plurality of Ethernet devices, then identifying that the one of the plurality of Ethernet devices is the particular one of the plurality of devices that causes the collective power limit to be exceeded, otherwise identifying that the one of the plurality of Ethernet devices is not the particular one of the plurality of devices that causes the collective power limit to be exceeded; and re-applying power to the one of the plurality of Ethernet devices and proceeding to temporarily terminate power to another one of the plurality of Ethernet devices, if the one of the plurality of Ethernet devices is not the particular one of the plurality of devices that causes the collective power limit to be exceeded.

2. A system as in claim 1 wherein:
the power monitor is to determine the amount of power collectively utilized by the plurality of Ethernet devices by measuring both the current and the voltage; and
the control system, when measuring the amount of power collectively used by the plurality of Ethernet devices with power temporarily terminated to the one of the plurality of Ethernet devices, is to measure the amount of power by using the power monitor to measure both the current and the voltage and multiplying the current by the voltage.

3. A system as in claim 1 wherein:
the power monitor is to determine the amount of power collectively utilized by the plurality of Ethernet devices by measuring the current and assuming a constant pre-defined voltage; and
the control system, when measuring the amount of power collectively used by the plurality of Ethernet devices with power temporarily terminated to the one of the plurality of Ethernet devices, is to measure the amount of power by using the power monitor to measure current and multiplying the current by the constant pre-defined voltage.

4. A system as in claim 1 wherein the control system, when is to determine the identity of the particular one of the plurality of devices, is to refrain from terminating power to the one of the plurality of devices if the one of the plurality of Ethernet devices has, as its associated power limit one of a plurality of pre-defined default values.

5. A system as in claim 4 wherein the plurality of pre-defined values are 15.4 watts, 7.5 watts, and 4.0 watts.

6. A system as in claim 1 wherein the collective power limit is a pre-defined maximum amount of power that the power supply is arranged to provide to the plurality of Ethernet devices.

7. A method for providing power to a plurality of Ethernet devices comprising:
allocating a power limit for each of the plurality of Ethernet devices, an allocated power limit for at least one of the plurality of Ethernet devices being other than 15.4 watts, 7.5 watts, and 4.0 watts;
providing power to one or more of the plurality of Ethernet devices;
determining the amount of power collectively utilized by the plurality of devices and determining that the amount of power exceeds a collective power limit for the plurality of Ethernet devices; and
in response to determining that the collective power limit is exceeded, terminating power to at least one, but not all, of the plurality of Ethernet devices;
wherein the particular one of the plurality of devices to which power is terminated is a device that is determined to cause the collective power limit to be exceeded;
wherein the method further comprises determining the identity of the particular one of the plurality of devices that cause the collective power limit to be exceeded;
wherein determining the identity comprises:
terminating power to one of the plurality of Ethernet devices;
measuring the amount of power collectively used by the plurality of Ethernet devices with power temporarily terminated to the one of the plurality of Ethernet devices, and subsequently subtracting the measured amount from the amount of power collectively used by the plurality of Ethernet devices prior to terminating power to the one of the plurality of Ethernet devices, thereby calculating a change in overall power usage attributable to the one of the plurality of Ethernet devices;

if the change in overall power usage attributable to the one of the plurality of Ethernet devices is greater than the power limit associated with the one of the plurality of Ethernet devices, then identifying that the one of the plurality of Ethernet devices is the particular one of the plurality of devices that causes the collective power limit to be exceeded, otherwise identifying that the one of the plurality of Ethernet devices is not the particular one of the plurality of devices that causes the collective power limit to be exceeded; and re-applying power to the one of the plurality of Ethernet devices and proceeding to temporarily terminate power to another one of the plurality of Ethernet devices, if the one of the plurality of Ethernet devices is not the particular one of the plurality of devices that causes the collective power limit to be exceeded.

8. A method as in claim 7 wherein:

determining the amount of power collectively utilized by the plurality of devices includes measuring both the current and the voltage and multiplying the current by the voltage; and measuring the amount of power collectively used by the plurality of Ethernet devices with power temporarily terminated to the one of the plurality of Ethernet devices includes measuring both the current and the voltage and multiplying the current by the voltage.

9. A method as in claim 7 wherein:

determining the amount of power collectively utilized by the plurality of devices includes measuring the current and the voltage and multiplying the current by a constant pre-defined voltage; and measuring the amount of power collectively used by the plurality of Ethernet devices with power temporarily terminated to the one of the plurality of Ethernet devices includes measuring the current and multiplying the current by the constant pre-defined voltage.

10. A method as in claim 7 wherein determining the identity further comprises:

refraining from terminating power to the one of the plurality of Ethernet devices if the one of the plurality of Ethernet devices has, as its associated power limit one of a plurality of pre-defined default values.

11. A method as in claim 10 wherein the plurality of pre-defined values are 15.4 watts, 7.5 watts, and 4.0 watts.

12. A system for providing power to a plurality of Ethernet devices comprising: a power supply to provide power to the plurality of Ethernet devices; a power monitor to determine an amount of power collectively utilized by the plurality of Ethernet devices; a power limit system to store a power limit associated with each of the respective ones of the plurality of Ethernet devices; and a control system to determine the identity of a particular one of the plurality of devices that causes the amount of power collectively used by the plurality of Ethernet devices to exceed a collective power limit and terminate power to the particular one of the plurality of devices; and wherein the control system determines the identity of the particular one of the plurality of devices by: terminating power to one of the plurality of Ethernet devices; measuring the amount of power collectively used by the plurality of Ethernet devices with power temporarily terminated to the one of the plurality of Ethernet devices, and subsequently subtracting the measured amount from the amount of power collectively used by the plurality of Ethernet devices prior to terminating power to the one of the plurality of Ethernet devices, thereby calculating a change in overall power usage attributable to the one of the plurality of Ethernet devices; if the change in overall power usage attributable to the one of the plurality of Ethernet devices is greater than the power limit associated with the one of the plurality of Ethernet devices, then identifying that the one of the plurality of Ethernet devices is the particular one of the plurality of devices that causes the collective power limit to be exceeded, otherwise identifying that the one of the plurality of Ethernet devices is not the particular one of the plurality of devices that causes the collective power limit to be exceeded; and re-applying power to the one of the plurality of Ethernet devices and proceeding to temporarily terminate power to another one of the plurality of Ethernet devices, if the one of the plurality of Ethernet devices is not the particular one of the plurality of devices that causes the collective power limit to be exceeded.

13. A system as in claim 12 wherein:

the power monitor is to determine the amount of power collectively utilized by the plurality of Ethernet devices by measuring both the current and the voltage; and the control system, when measuring the amount of power collectively used by the plurality of Ethernet devices with power temporarily terminated to the one of the plurality of Ethernet devices, is to measure the amount of power by using the power monitor to measure both the current and the voltage and multiplying the current by the voltage.

14. A system as in claim 12 wherein:

the power monitor is to determine the amount of power collectively utilized by the plurality of Ethernet devices by measuring the current and assuming a constant pre-defined voltage; and the control system, when measuring the amount of power collectively used by the plurality of Ethernet devices with power temporarily terminated to the one of the plurality of Ethernet devices, is to measure the amount of power by using the power monitor to measure current and multiplying the current by the constant pre-defined voltage.

15. A system as in claim 12 wherein the control system, when is to determine the identity of the particular one of the plurality of devices, is to refrain from terminating power to the one of the plurality of devices if the one of the plurality of Ethernet devices has, as its associated power limit one of a plurality of pre-defined default values.

16. A system as in claim 15 wherein the plurality of pre-defined values are 15.4 watts, 7.5 watts, and 4.0 watts.

17. A system as in claim 12 wherein the collective power limit is a pre-defined maximum amount of power that the power supply is arranged to provide to the plurality of Ethernet devices.

* * * * *

UNITED STATES PATENT AND TRADEMARK OFFICE
CERTIFICATE OF CORRECTION

PATENT NO. : 7,509,505 B2  Page 1 of 1
APPLICATION NO. : 11/028907
DATED : March 24, 2009
INVENTOR(S) : Anthony L. Randall, Robert A. Marshall and Rachel C. Neal It is certified that error appears in the above-identified patent and that said Letters Patent is hereby corrected as shown below:

Claim 4, Column 8, Lines 24-26, "A system as in claim 1 wherein the control system, when is to determine the identity of the particular one of the plurality of devices, is to refrain from terminating power to the one" should read --A system as in claim 1 wherein the control system, when determining the identity of the particular one of the plurality of devices, is to refrain from terminating power to the one--.

Claim 15, Column 10, Lines 48-49, "A system as in claim 12 wherein the control system, when is to determine the identity of the particular one of the" should read --A system as in claim 12 wherein the control system, when determining the identity of the particular one of the--.

Signed and Sealed this

Fifth Day of May, 2009

JOHN DOLL
*Acting Director of the United States Patent and Trademark Office*